United States Patent [19]

Matumura et al.

[11] Patent Number: 5,721,073
[45] Date of Patent: Feb. 24, 1998

[54] ELECTRODES FOR BATTERY AND METHOD FOR FABRICATING THE SAME

[75] Inventors: Jun Matumura; Kuninori Omura, both of Kamakura; Chikara Kasai, Fujisawa; Sadaaki Yokoh, Yokohama; Hitoshi Mikuriya, Chigasaki, all of Japan

[73] Assignee: Matsushita Electric Industrial Co., Ltd., Osaka-fu, Japan

[21] Appl. No.: 600,662

[22] Filed: Feb. 13, 1996

[30] Foreign Application Priority Data

Oct. 9, 1995 [JP] Japan .................. 7-261267

[51] Int. Cl.$^6$ ............................................. H01M 4/64
[52] U.S. Cl. ................... 429/233; 424/236; 424/245
[58] Field of Search ............................. 429/233, 235, 429/236, 238, 241, 242, 245, 223

[56] References Cited

U.S. PATENT DOCUMENTS

| 4,251,603 | 2/1981 | Matsumoto et al. | |
|---|---|---|---|
| 4,582,098 | 4/1986 | Matsumoto et al. | |
| 5,196,281 | 3/1993 | Pensabene et al. | 429/211 |
| 5,434,020 | 7/1995 | Cooper | 429/210 |
| 5,487,961 | 1/1996 | Strangeways et al. | 429/233 |
| 5,498,496 | 3/1996 | Sasaki et al. | 429/233 |

FOREIGN PATENT DOCUMENTS

| 0 126 160 A1 | 11/1984 | European Pat. Off. . |
|---|---|---|
| 0 301 647 A1 | 2/1989 | European Pat. Off. . |
| 2 711 015 A1 | 4/1995 | France . |
| A 55-041 680 | 3/1980 | Japan . |
| A 55-166 865 | 12/1980 | Japan . |
| A 58-161 251 | 9/1983 | Japan . |
| A 59-143 275 | 8/1984 | Japan . |
| A 59-207 560 | 11/1984 | Japan . |
| A 60-133 655 | 7/1985 | Japan . |
| A 62-139 256 | 6/1987 | Japan . |
| A 62-140 359 | 6/1987 | Japan . |
| A 62-147 657 | 7/1987 | Japan . |
| A 05 006 762 | 1/1993 | Japan . |
| 07-65816 | 3/1995 | Japan . |

*Primary Examiner*—M. Nuzzolillo
*Attorney, Agent, or Firm*—Panitch Schwarze Jacobs & Nadel, P.C.

[57] ABSTRACT

An electrode for a battery with small dispersion in its discharge capacity and excellent reliability is disclosed. It comprises a sheet of porous metal substrate having three-dimensional communicating spaces, and an active material. The substrate has a higher porosity layer occupying most part of the spaces connected to the first principal face and a lower porosity layer occupying the remaining part of the spaces connected to the second principal face; the lower porosity layer has a sufficiently smaller thickness than the higher porosity layer; and the active material is filled substantially in the higher porosity layer.

8 Claims, 6 Drawing Sheets

ELECTRODES FOR BATTERY AND METHOD FOR FABRICATING THE SAME

BACKGROUND OF THE INVENTION

1. Field of the Invention

The present invention relates to electrodes for a battery, particularly a nickel electrode for an alkaline storage battery, and further relates to a method for fabricating the same.

2. Description of the Prior Art

Electrodes for a battery are roughly classified into three general groups: paste-type electrode, sintered-type electrode and pocket-type electrode. Recently, as a new method for fabricating the nickel electrode for the alkaline storage battery, a method for fabricating the paste-type electrode has been put to practical use and is now frequently used. The method comprises filling a pasty mixture (hereinafter referred to as "paste") composed essentially of an active material powder into spaces formed in a substrate such as a foamed metal or a nonwoven fabric of nickel fibers having three-dimensional communicating spaces.

Since such metal substrates have a porosity, i.e., a proportion occupied by the spaces to the total substrate, of as high as 95% and a maximal diameter of several hundreds μm for the spaces, it is possible to directly fill the active material powder or the paste into the spaces. As a result, these metal substrates can be finished into electrodes in a simple process.

Conventional practical and specific methods of filling the active material into the spaces of the metal substrate include a method of vibrating the paste, thereby to fill it into the spaces, a method of rubbing the paste to fill it into the spaces with a tool such as doctor knife, a method of contacting the paste with one face of the metal substrate while decompressing the other face so as to force the paste into the spaces, and a method of spraying the paste onto the spaces of the metal substrate through a nozzle.

Of these methods, the rubbing method and the spraying method are superior from the standpoint of uniformly filling the active material into the spaces of the metal substrate. A comparison of these two methods shows that the spraying method is superior to the rubbing method in view of the durability and easy and simple manipulation and maintenance of the device used for filling.

In spite of the above-mentioned excellence, the spraying method has such drawback that it is difficult to fill the paste uniformly into the spaces of the metal substrate such as a foamed porous metal substrate, for instance. That is, the spraying method comprises spraying the paste onto both faces of the foamed porous metal substrate at a certain rate while allowing the paste to spout out through nozzles to force it to be filled in the spaces of the substrate. Thus, this method has a drawback that a portion of the paste which has first entered the spaces near the surfaces of the substrate may sometimes be removed therefrom by an impinging action of the remaining portion of the paste which is subsequently sprayed. Another disadvantage is that the paste, which has impinged upon the surface of the metal substrate itself, may sometimes be sprung back therefrom.

Therefore, the spraying method is unsatisfactory from the standpoint of uniformly filling a preadjusted amount of the paste into the spaces of the porous metal substrate and leaves much to be improved. That is, it is strongly desired from the practical point of view to further decrease dispersion (scatter) in the filled amount of the paste, thereby to decrease the dispersion in the battery capacity.

SUMMARY OF THE INVENTION

Therefore, the primary object of the present invention is to provide an electrode for a battery comprising a sheet or a plate-like porous metal substrate having three-dimensional communicating spaces, particularly a nickel electrode with minimal dispersion in the filled amount of the active material, and to provide a battery of large capacity with less dispersion in the discharge capacity.

The present invention provides an electrode for a battery comprising:

a sheet of porous metal substrate having three-dimensional communicating spaces for containing an active material defined by a first principal face and a second principal face, wherein the substrate has a higher porosity layer occupying most part of the spaces connected to the first principal face and a lower porosity layer occupying the remaining part of the spaces connected to the second principal face;

the lower porosity layer has a sufficiently smaller thickness than the higher porosity layer; and the active material is filled substantially in the higher porosity layer.

In the above-mentioned electrode for a battery, the second principal face of the porous metal substrate is preferably not covered with the active material.

The porous metal substrate is preferably any of a foamed nickel, a nonwoven fabric made of nickel fibers or a sintered plaque of nickel powder.

It is preferable that the second principal face of the porous metal substrate is provided with a plurality of parallel grooves.

Any of the above-mentioned electrodes for a battery is preferably applied to a nickel electrode for an alkaline storage battery.

Further, the present invention is directed to a method of fabricating an electrode for a battery comprising the steps of:

providing a sheet or plate-like porous metal substrate having three-dimensional communicating spaces defined by a first principal face and a second principal face and placing a nozzle for spouting an active material to directly face the first principal face of the porous metal substrate, and filling the active material into the three-dimensional communicating spaces of the porous metal substrate by allowing the active material to spout out through the nozzle while relatively moving one of the substrate and the nozzle with respect to the other, and regulating the spouting operation so as to allow the active material to penetrate the spaces not to reach up to the second principal face of the porous metal substrate.

As a preferred specific method of fabricating the electrode for a battery, there is provided a method which comprises the steps of:

transferring a belt-like porous metal substrate having three-dimensional communicating spaces along its longitudinal direction, filling a pasty mixture consisting essentially of an active material into the three-dimensional communicating spaces of the porous metal substrate by allowing the pasty mixture to spout out through a nozzle on one face of the porous metal substrate so as to allow the pasty mixture to penetrate the spaces from one face to the other face of the porous metal substrate, while transferring the porous metal substrate and regulating the spouting operation so as not to allow the pasty mixture to reach up to the other face of the porous metal substrate, and then pressing the porous metal substrate between both faces thereof to reduce its thickness.

In the above-mentioned method of fabricating the electrode for a battery, it is preferable to maintain the distance between the porous metal substrate and the nib of the nozzle at 1.0 mm or smaller.

The above-mentioned method of fabricating an electrode for a battery preferably includes a step of providing a plurality of grooves or cut-lines on one face of the porous metal substrate parallel to its longitudinal direction.

It is also preferable that the pasty mixture contains water as a dispersing medium 20–30% by weight of the whole pasty mixture.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF THE PREFERRED EMBODIMENTS

According to the present invention, it is possible to effectively obviate the phenomenon that a portion of the paste which has first entered the spaces near the surface of the substrate may sometimes be removed therefrom by an impinging action of the remaining portion of the paste which is sprayed thereafter, by allowing the paste to spout out through the nozzle onto only one face of the porous metal substrate not to let the paste to penetrate through the spaces near the other face of the porous metal substrate. It is further possible to reduce the dispersion in the filled amount of the paste by adequately regulating the amount to be filled in the spaces of the porous metal substrate, thereby to produce an electrode having a favorable conductive network throughout an electrode plate and to increase the battery capacity.

By making the distance between the porous metal substrate and a nib of the nozzle placed close proximity to one face of the porous metal substrate 1 mm or smaller during the operation of allowing the paste to spout out through the nozzle and filling it into the spaces of the porous metal substrate, it is also possible to decrease a possibility that the paste which has impinged upon the surface of the metal substrate itself may be sprung back therefrom, thereby to enable a stable supply of the paste and to reduce the dispersion in the filled amount of the paste. By reducing the water content of the paste appropriately, it is possible to increase the actual filling density of the active material powder in the spaces of the porous metal substrate, thereby to further increase the battery capacity.

In the following paragraphs, the present invention will be described more specifically with reference to its preferred embodiments.

EXAMPLE 1

A paste was prepared by adding 10 parts by weight of nickel metal powder having a particle diameter of about 2–3 μm and 5 parts by weight of cobalt oxide powder having a particle diameter of about 2–3 μm to 100 parts by weight of nickel hydroxide having an average particle diameter of 10 μm, in their powder state, then adding water as a dispersing medium to the obtained mixture so that the proportion of the water in the whole paste was made 20% by weight and thereafter kneading the final mixture.

Figure 1:
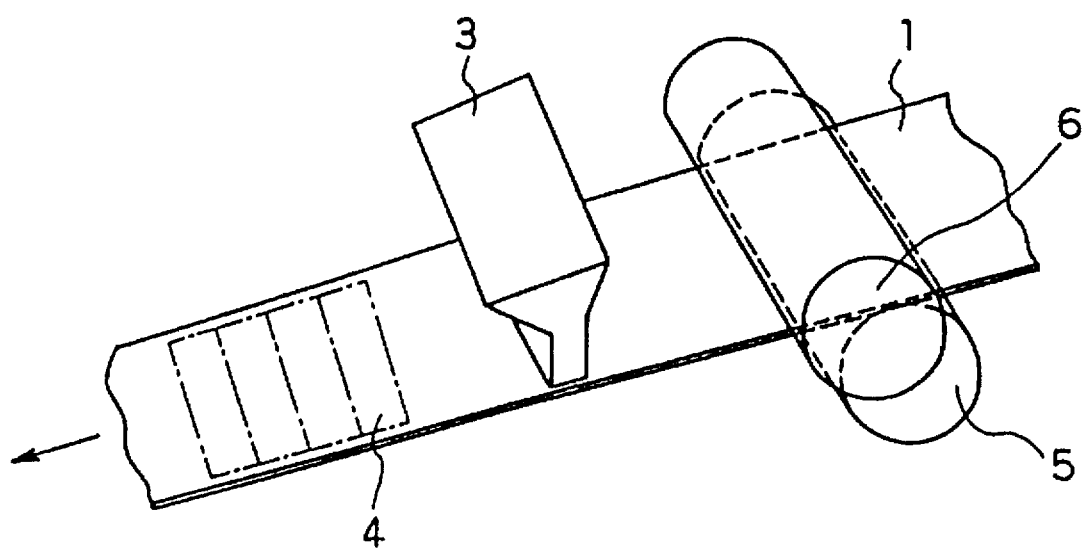
FIG. 1 is a schematic perspective view showing a method for fabricating an electrode in accordance with the present invention.

FIG. 1 schematically shows a mode of fabricating an electrode in accordance with the present invention. In FIG. 1, a spouting nozzle 3 is so provided that it faces one face of a belt-like foamed porous nickel substrate 1 having a width of 100 mm, a thickness of 2.5 mm, a porosity of 98% and a mean pore size of 200 μm, which correspond to the size of its three-dimensional communicating spaces. And, the paste prepared in the above-mentioned manner was allowed to spout out through this nozzle 3, to be filled into the three-dimensional communicating spaces of the porous nickel substrate 1, while transferring the porous nickel substrate along its longitudinal direction. In this figure, numerals 5 and 6 designate rollers for transferring the porous nickel substrate.

During the filling process, a distance between the nib of the nozzle 3 and the porous metal substrate 1 was kept at 0.1 mm, and the amount of the paste spouting out through the nozzle 3 was maintained at a rate of 30–33 g/second. When filling the paste into the spaces of the porous nickel substrate, the transferring speed of the porous nickel substrate was so regulated as to allow the paste to penetrate the spaces from its one face of the porous metal substrate but not to reach up to the other face of the porous metal substrate 1. More specifically, the filling process was regulated in terms of the transferring speed of the porous nickel substrate so as to allow the paste to penetrate the spaces up to a part which corresponds to about 80% of the thickness of the porous metal substrate but not to reach the remaining 20% of the porous metal substrate. As a result, it was found that a preferable transferring speed of the porous metal substrate was 7 m/minute.

Although omitted in FIG. 1 for brevity, a belt or rotor for supporting the porous metal substrate was provided on the other face of the porous metal substrate 1 in order to maintain the distance between the nib of the nozzle 3 and the porous metal substrate 1 constant, even when a pressure was exerted on the porous metal substrate by an action of the spouted paste.

The porous metal substrate thus filled with the paste was then pressed to reduce its thickness to 1.0 mm. By this pressing process, the three-dimensional communicating spaces of the porous metal substrate were filled with the paste substantially completely. On the side of the face which had not faced the nozzle, the spaces of the porous metal substrate were crushed and narrowed, and the porosity of the porous metal substrate was reduced. As a result, the proportion of the metal structure occupying the substrate increased. The paste was not allowed to project from the surface of that side or to expose itself on the surface.

The above-mentioned porous metal substrate 1 filled with the paste was then cut into a rectangular sheet having a width of 35 mm and a length of 87 mm as indicated by the dot-dashed line in FIG. 1. A lead conductor was spot-welded on a predetermined point of the cut rectangular sheet 4 to produce an electrode plate "a". The amount of the active material filled in the electrode plate "a" ranged from 9 to 10 grams.

An electrode group was assembled with three sheets of nickel electrode 7 produced in the above-mentioned manner, known separators 8 which envelop each of the nickel electrodes in a U-shape fashion and two U-shaped bent sheets of metal hydride negative electrode 9 of a hydrogen storage alloy comprising misch metal and nickel. The assembled electrode group was then inserted into a battery housing 10. After a predetermined amount of an alkaline electrolyte was injected into the housing and an open end of the housing was sealed with a sealing plate 11, a rectangular nickel-metal hydride storage battery A was configured as shown in FIG. 6.

Figure 6:
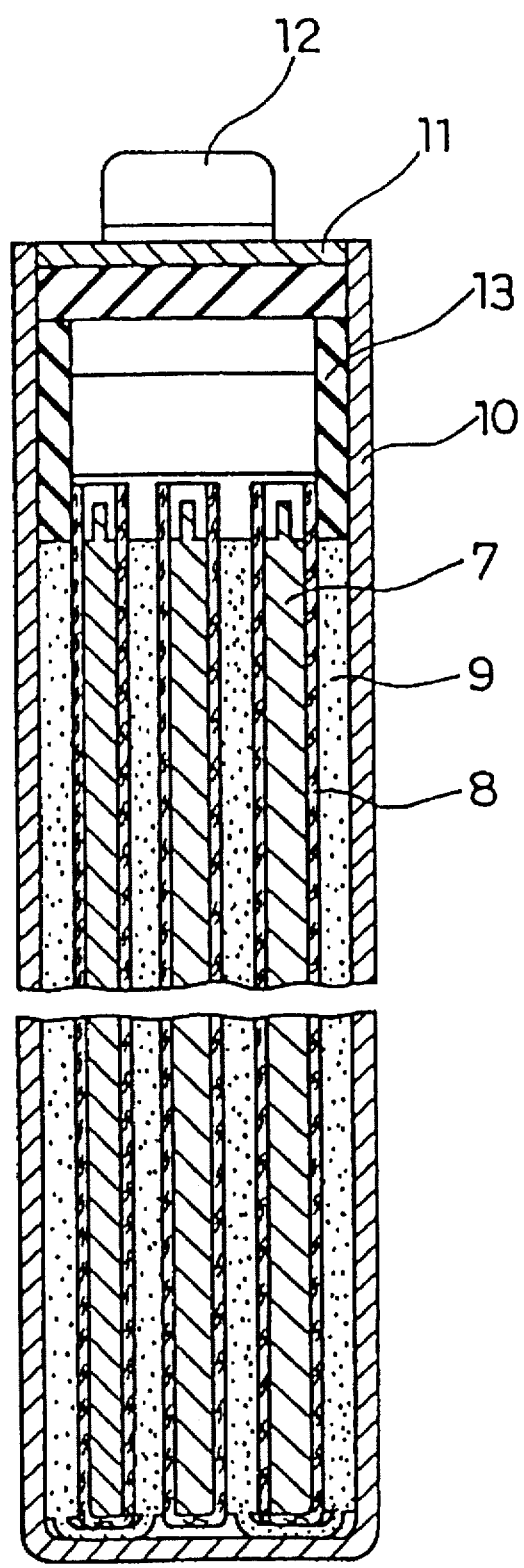
FIG. 6 is a partly-fragmented cross-sectional view showing an example of a rectangular battery in accordance with the present invention.

As shown in FIG. 6, the assembled electrode group housed in the battery housing 10 made of nickel-plated steel which was sealed by the sealing plate 11 made of nickel-plated steel and welded on an open end of the battery housing 10. The sealing plate 11 was provided with a positive electrode terminal 12 which was insulated from the sealing plate 11 and a safety valve (not shown). The negative electrode 9 was connected to the battery housing 10 which serves as the negative electrode terminal.

Figure 2:
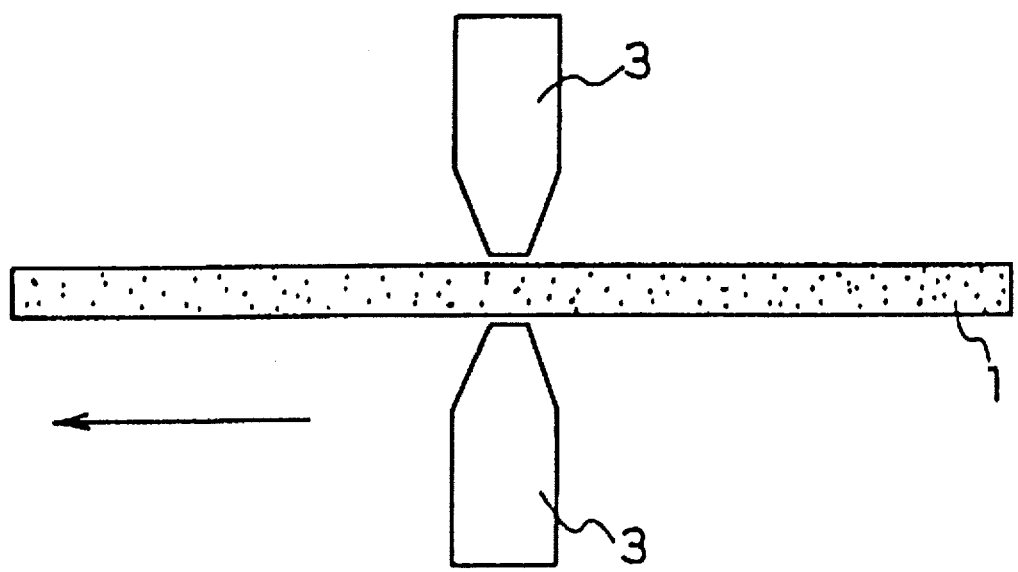
FIG. 2 is a schematic view showing a method for fabricating an electrode of a conventional example.

For comparison, Battery B was configured by generally following the above procedure except for the use of a nickel electrode "b" produced by a conventional paste-spraying process wherein a foamed nickel porous substrate 1 was filled with the paste by allowing the paste to spout out through two nozzles 3 placed on both sides of the moving porous substrate, to face both faces of the moving porous substrate as shown in FIG. 2.

Each 100 pieces of Batteries A and B were configured for being investigated with respect to their discharge capacities at 1C discharging. As a result, it was found that the battery capacity was from 1.80 Ah to 1.87 Ah for Battery A and from 1.80 Ah to 2.01 Ah for Battery B. This clearly indicates that the dispersion in the discharge capacity of Battery A is smaller than that of Battery B.

EXAMPLE 2

A procedure similar to that in Example 1 was generally followed for producing a battery and measuring its discharge capacity, wherein the same belt-like porous nickel substrate, the same paste prescription, a similar filling process and the same battery production process as those in Example 1 were employed. In the filling process, however, the distance between the nib of the nozzle 3 and the porous metal substrate 1 was varied while maintaining the spouting rate of the paste through the nozzle 3 constant.

Figure 3:
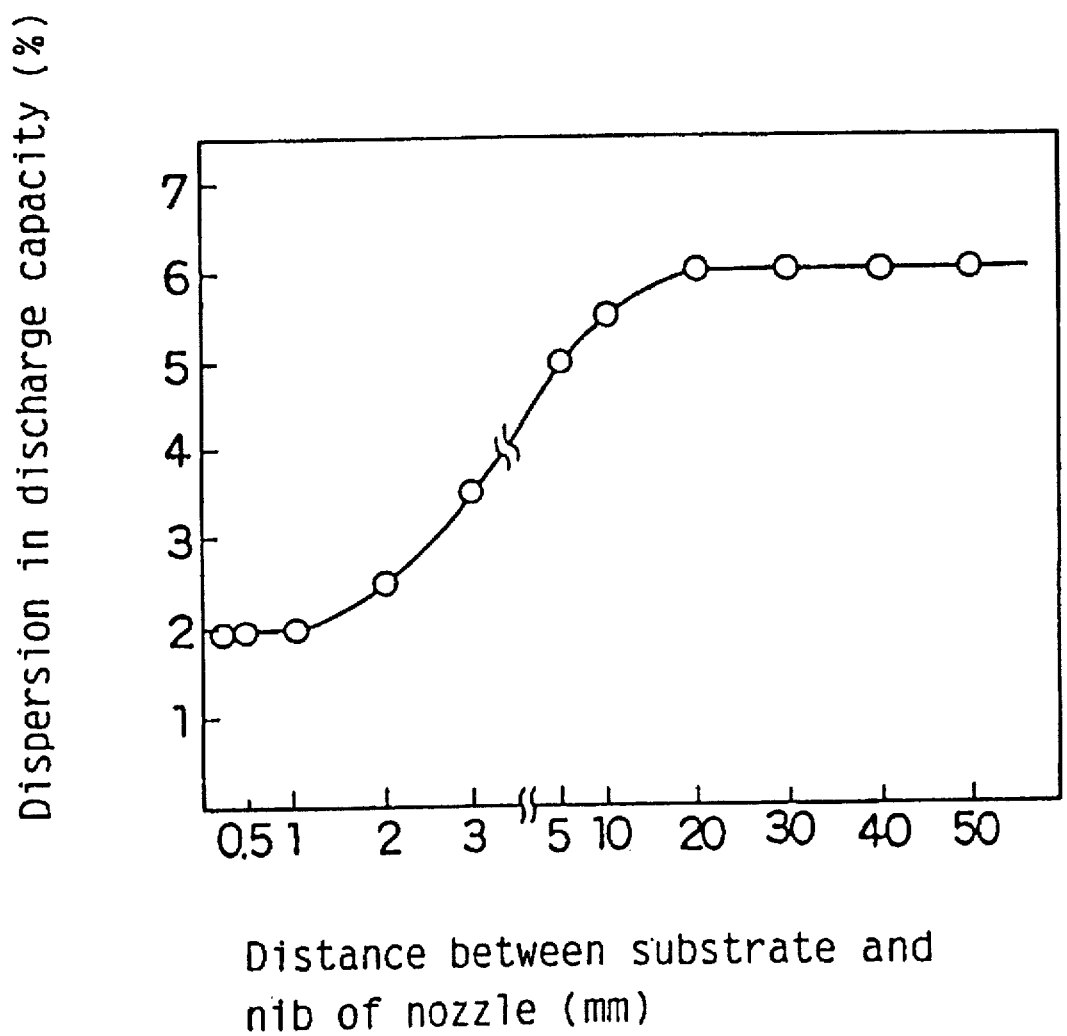
FIG. 3 is a diagram showing a relationship between the distance between the porous metal substrate and the nozzle of the fabricating method in accordance with the present invention and the dispersion in the discharge capacity.

FIG. 3 is a diagram showing the relationship between the distance between the nib of the nozzle and the porous metal substrate, and the dispersion in the discharge capacity of the obtained battery. As clearly shown by this diagram, it was possible to stably supply the paste and to reduce the dispersion in the discharge capacity by maintaining the distance between the nib of the nozzle and the porous metal substrate 1.0 mm or smaller.

EXAMPLE 3

Under the conditions identical with those in Example 1, except that the water content of the paste was changed from 20% to 50% by weight for the whole paste composition employed in Example 1, a belt-like porous nickel substrate was filled with the paste by allowing the paste to spout out through a nozzle placed close to one face of the substrate which was allowed to travel along its longitudinal direction.

Figure 4:
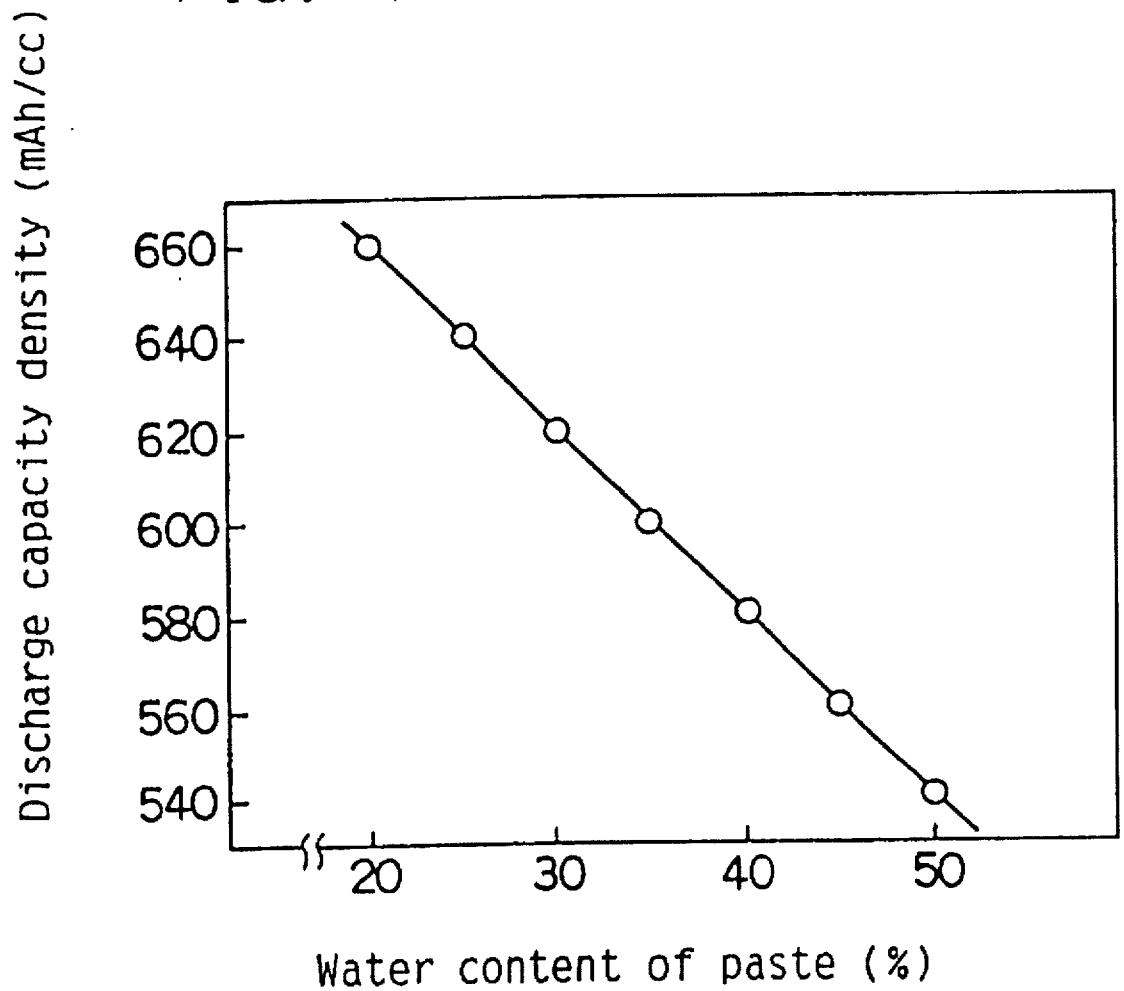
FIG. 4 is a diagram showing a relationship between the water content of the pasty mixture in accordance with the present invention and the density of the discharge capacity.

FIG. 4 is a diagram showing the relationship between the water content of the paste and the discharge capacity density of the obtained battery. As clearly shown by this diagram, it was possible to increase the discharge capacity density of the electrode by reducing the water content of the paste, namely, the former is inversely proportional to the latter.

In consideration of fluidity of the paste required for the passage through the nozzle, smoothness in the spouting operation of the paste through the nozzle, and the actual filled amount of the active material powder itself in the spaces of the porous substrate as a whole, it is concluded that the amount of water to be added to the paste as a dispersing medium is preferably from 20% to 30% by weight for the whole paste.

EXAMPLE 4

Figure 5:
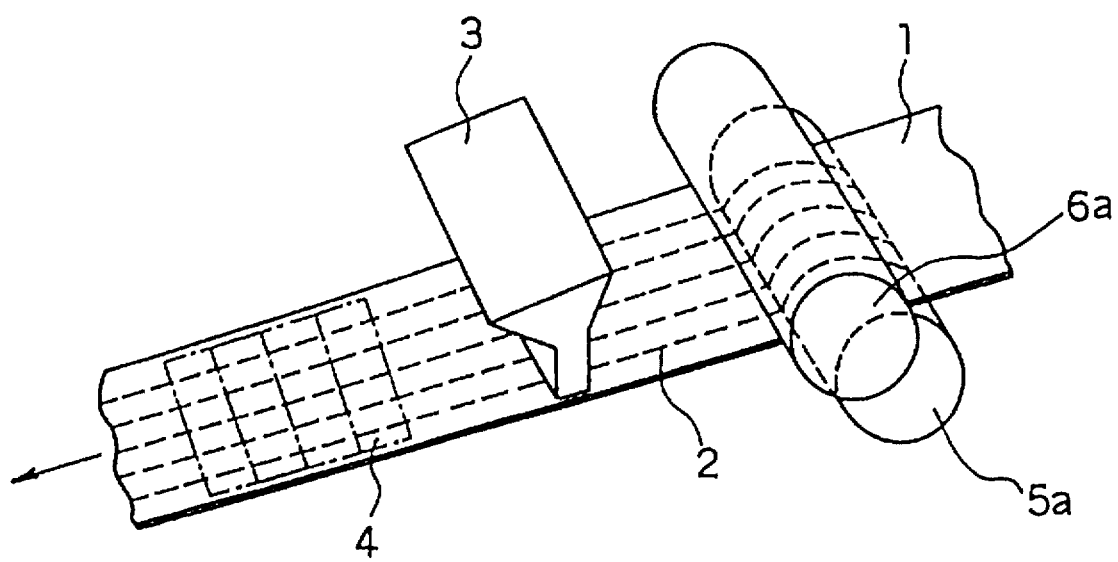
FIG. 5 is a schematic perspective view showing another method for fabricating an electrode in accordance with the present invention.

The same belt-like porous nickel substrate as that of Example 1 and the same prescription of the paste as that of Example 1 were employed in this example. And, as shown in FIG. 5, a plurality of grooves 2 having a depth of about 0.3 mm and a width of about 1 mm were provided on one face (bottom side) of the above-mentioned porous nickel substrate along its lengthwise direction. AS shown in FIG. 5, the grooves were actually provided by transferring the substrate between a ribbed roller 5a provided on one face (bottom side) of the substrate and a follower roller 6a provided on the other face (top side) of the substrate, respectively, and by pressing the substrate 1 with both rollers from both sides. Then, in the same manner as that in Example 1, the paste was allowed to spout out through the nozzle 3 onto the other face (top side) of the porous substrate 1 to be filled into the spaces of the substrate.

Except for the provision of the grooves, the procedure of Example 1 was generally followed in producing an electrode plate. This was named electrode "c" in accordance with the present invention. On one face of the electrode "c", there were provided five grooves 2 at equivalent intervals.

Another battery as shown in FIG. 6 was configured by employing this electrode "c" as its positive electrode, a known separator and a negative electrode of metal hydride electrode, and by following the same procedure as that of Example 1. This was named Battery C. In Battery C, the grooves 2 in the electrode "c" are perpendicularly disposed.

Each 1,000 cells of Batteries C and B as disclosed in Example 1 provided for comparative purpose were measured for their dispersions in the discharge capacity. From the measurements, it was found that a mode of the dispersions in the discharge capacity of Batteries C and B was comparable to that obtained with the above-mentioned Batteries A and B, respectively.

It is believed that Battery C in accordance with this example can reduce the dispersion in the discharge capacity resulting from the dispersion in the amount of the filled paste as compared with Battery B, because the electrode "c" was filled with the paste from one face of the porous metal substrate and the paste did not reach the other face of the porous metal substrate, whereas the electrode "b" was filled with the paste from both faces of the porous metal substrate.

Since Battery C in accordance with this example is provided with the grooves perpendicular to one face of the positive electrode, these grooves serve as a passageway for exhausting oxygen gas which may generate at the time of overcharging and aid absorption of the gas at the negative electrodes. It is possible to substitute cut-lines for the above-mentioned grooves to secure the passageway for exhausting oxygen gas.

In the previous examples, the descriptions are limited to the use of the foamed nickel as the porous metal substrate, it is needless to say that the technical advantages similar to those with the foamed nickel can also be obtained if a nonwoven fabric of nickel fibers and a sintered plaque of nickel powder without skeletal structure are employed, as far as these substrates have the three-dimensional communicating spaces.

As described previously, in the case of employing the electrode in accordance with the present invention or the electrode obtained by the fabricating method in accordance with the present invention, it is possible to reduce the dispersion in the discharge capacity due to the dispersion in the actual filled amount of the active material and to ensure a favorable conductive network throughout the electrode, thereby to provide a storage battery having a high capacity and excellent reliability.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. An electrode for a battery comprising:
   a sheet of porous metal substrate having three-dimensional communicating spaces for containing an active material defined by a first principal face and a second principal face,
   wherein said substrate has a higher porosity layer occupying said spaces connected to said first principal face and a lower porosity layer occupying said spaces connected to said second principal face;
   said lower porosity layer has a smaller thickness than said higher porosity layer;
   said active material substantially fills the three-dimensional communicating spaces in said higher porosity layer; and,
   wherein said lower porosity layer is free of active material filling the three-dimensional communicating spaces of said lower porosity layer and wherein the volumetric proportion of metal in said lower porosity layer is larger than that of said higher porosity layer.

2. The electrode for a battery in accordance with claim 1, wherein said second principal face of said porous metal substrate is not covered with the active material.

3. The electrode for a battery in accordance with claim 1, wherein said porous metal substrate is a foamed nickel.

4. The electrode for a battery in accordance with claim 1, wherein said porous metal substrate is a nonwoven fabric of nickel fibers.

5. The electrode for a battery in accordance with claim 1, wherein said porous metal substrate is a sintered plaque of nickel powder.

6. The electrode for a battery in accordance with claim 1, wherein said active material is nickel hydroxide.

7. An electrode for a battery comprising:
   a sheet of porous metal substrate having three-dimensional communicating spaces for containing an active material defined by a first principal face and a second principal face and a plurality of parallel grooves provided on said second principal face,
   wherein said substrate has a higher porosity layer occupying said spaces connected to said first principal face and a lower porosity layer occupying said spaces connected to said second principal face;
   said lower porosity layer has a smaller thickness than said higher porosity layer;
   said active material substantially fills the three-dimensional communicating spaces in said higher porosity layer; and
   wherein said lower porosity layer is free of active material filling the three-dimensional communicating spaces of said lower porosity layer and wherein the volumetric proportion of metal in said lower porosity layer is larger than that of said higher porosity layer.

8. The electrode for a battery in accordance with claim 7, wherein said active material is nickel hydroxide.

* * * * *